United States Patent
DeCia et al.

(10) Patent No.: US 10,266,149 B1
(45) Date of Patent: Apr. 23, 2019

(54) VEHICLE UNLOCKING SYSTEMS, DEVICES, AND METHODS

(71) Applicant: Ford Global Technologies, LLC, Dearborn, MI (US)

(72) Inventors: Nunzio DeCia, Northville, MI (US); David A. Herman, Southfield, MI (US); Nicholas Alexander Scheufler, Flat Rock, MI (US); David Joseph Orris, Southgate, MI (US); Stephen Jay Orris, Jr., New Boston, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 24 days.

(21) Appl. No.: 15/829,468

(22) Filed: Dec. 1, 2017

(51) Int. Cl.
*B60R 25/24* (2013.01)
*G08G 1/127* (2006.01)

(52) U.S. Cl.
CPC ............. *B60R 25/24* (2013.01); *G08G 1/127* (2013.01); *B60R 2325/205* (2013.01)

(58) Field of Classification Search
CPC ............. B60R 25/24; B60R 2325/205; B60R 25/2018; G08G 1/127
See application file for complete search history.

(56) References Cited

U.S. PATENT DOCUMENTS

| | | | | |
|---|---|---|---|---|
| 9,276,736 B2 * | 3/2016 | Peirce | ............. | H04L 9/0819 |
| 9,544,853 B1 * | 1/2017 | Gu | ............. | H04W 52/0261 |
| 2014/0058586 A1 * | 2/2014 | Kalhous | ............. | B60R 25/24 |
| | | | | 701/2 |
| 2014/0242971 A1 * | 8/2014 | Aladenize | ............. | G07B 15/00 |
| | | | | 455/420 |
| 2015/0149042 A1 * | 5/2015 | Cooper | ............. | B60R 16/037 |
| | | | | 701/48 |
| 2016/0300417 A1 * | 10/2016 | Hatton | ............. | G07C 9/00857 |
| 2017/0118178 A1 * | 4/2017 | Fruehling | ............. | B60R 25/24 |

FOREIGN PATENT DOCUMENTS

| CN | 104648321 B | 2/2017 |
|---|---|---|
| KR | 101667990 B1 | 10/2016 |

OTHER PUBLICATIONS

Christoph Busold et al., *Smart Keys for Cyber-Cars: Secure Smartphone-based NFC-enabled Car Immobilizer*, Feb. 2013, 10 pages.
Unpublished pending U.S. Appl. No. 15/615,600, filed Jun. 6, 2017 which is not being furnished herewith, pursuant to the Commissioner's Notice dated Sep. 21, 2004.

* cited by examiner

*Primary Examiner* — Thomas D Alunkal
(74) *Attorney, Agent, or Firm* — Frank Lollo; James P. Muraff; Neal, Gerber & Eisenberg LLP

(57) ABSTRACT

Systems, devices, and methods are disclosed for unlocking a vehicle. An example vehicle unlock system includes a remote computing device configured to determine that the remote computing device will enter a compromised status in which the remote computing device cannot communicate with a server, responsively request an electronic key, and unlock the vehicle using the electronic key. The system also includes a server configured to store and transmit the electronic key.

20 Claims, 4 Drawing Sheets

VEHICLE UNLOCKING SYSTEMS, DEVICES, AND METHODS

TECHNICAL FIELD

The present disclosure generally relates to vehicle unlocking systems, devices, and methods and, more specifically, techniques that involve using a remote device such as a phone rather than a traditional key.

BACKGROUND

A typical vehicle may be unlocked with a key. However in some cases, a user may use a separate device to unlock the vehicle, such as a phone or other remote computing device. Some devices may require power to communicate with and unlock the vehicle, while others may not. Further, some devices may include an electronic key which match a corresponding electronic key stored by the vehicle. If there is no match, the vehicle may not be unlocked.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for remote vehicle unlocking systems, devices, and methods. An example disclosed vehicle unlock system includes a remote computing device configured to determine that the remote computing device will enter a compromised status in which the remote computing device cannot communicate with a server, responsively request an electronic key, and unlock the vehicle using the electronic key. The vehicle unlock system also includes a server configured to store and transmit the electronic key.

An example disclosed method includes determining that a remote computing device will enter a compromised status in which the remote computing device cannot communicate with a server. The method also includes responsively requesting an electronic key. And the method further includes unlocking the vehicle using the electronic key.

An example disclosed non-transitory, computer readable medium includes instructions that, when executed by a processor, cause performance of a set of acts including determining that a remote computing device will enter a compromised status in which the remote computing device cannot communicate with a server. The set of acts further includes responsively requesting an electronic key from the server. And the set of acts still further includes unlocking a vehicle using the electronic key.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
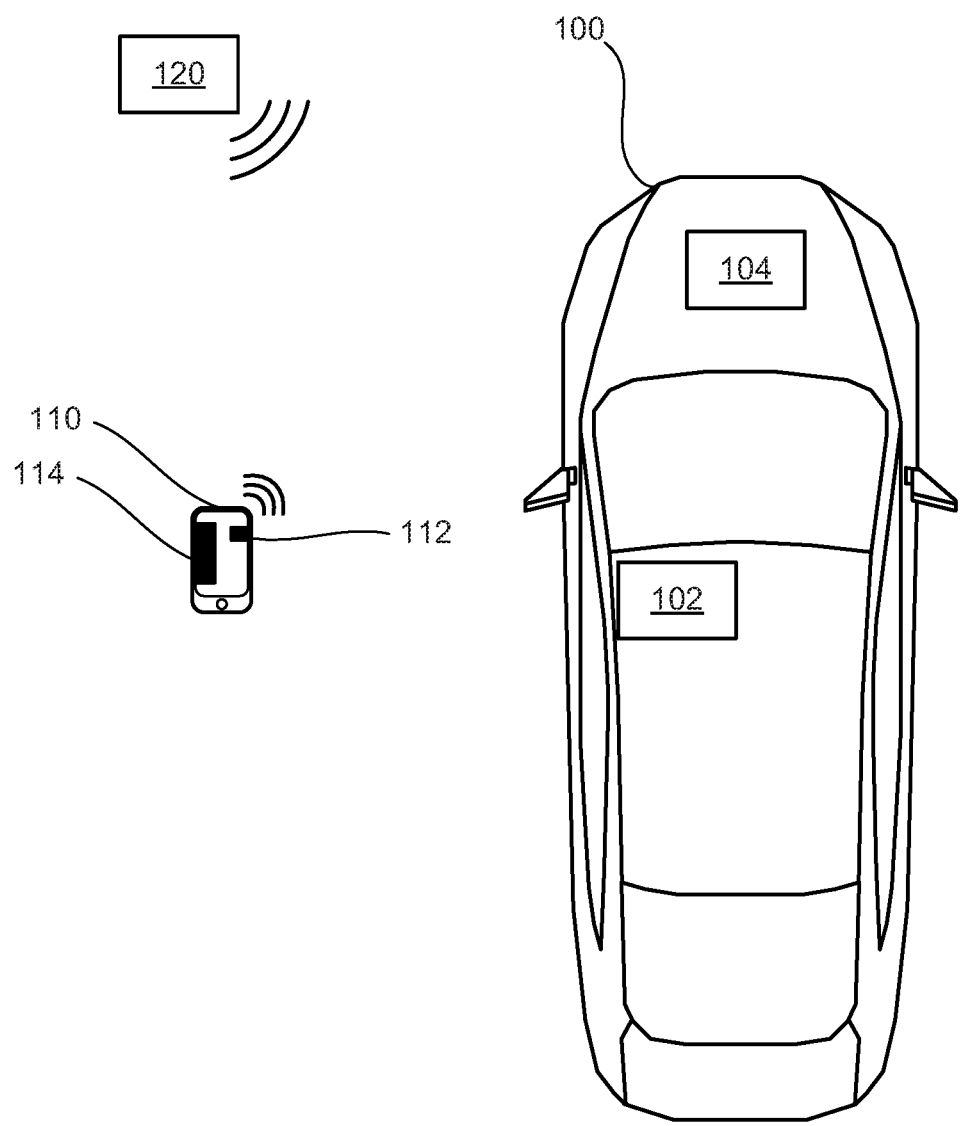
FIG. 1 illustrates an example vehicle, remote computing device, and server according to embodiments of the present disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

As noted above, example devices, systems, and methods disclosed herein relate to unlocking a vehicle using a remote computing device, rather than a traditional key that must be inserted into a lock and turned. The remote computing device may be a phone or other personal computing device, such as a wearable device (e.g., watches, activity monitors, or other devices configured for wireless communication) and may sometimes be referred to as a phone-as-a-key (PaaK) or PaaK device. PaaK technology may facilitate accessing functions traditionally associated with a key fob or traditional key via an application executing on a smart phone. In some examples, the smart phone may require power to operate the PaaK application, and as such may not be able to unlock the vehicle if the phone is dead. But in other examples, power may not be required.

A remote computing device acting as a key may include an electronic key that is communicated to the vehicle in order to unlock the door. In some cases, if the remote computing device has a low battery or is dead it may not be possible to unlock the vehicle using the remote computing device. This may be the case where the remote computing device requires power to transmit the electronic key to the vehicle. Further, where the phone is dead, it may take several minutes to charge the phone sufficiently to power on and load the appropriate application to unlock the vehicle. This is particularly problematic and can cause a bad user experience where the environment of the vehicle is unsafe or where weather conditions are not ideal, as it may increase the amount of time a user is waiting outside a locked vehicle.

In other cases, a low or dead battery of a phone may not prevent the remote computing device from unlocking the vehicle. As described herein, some remote computing devices may make use of near field communication technology in order to communicate with the vehicle. In these examples, the vehicle may be powered while the remote computing device is not. And yet even though the remote computing device is not powered, it may be used in combination with the powered vehicle in order to unlock the vehicle.

For safety purposes, a server may be used to provide one or more functions such as transmitting electronic keys to the vehicle and/or remote computing device, syncing electronic keys, or otherwise ensuring that unauthorized persons are not able to unlock the vehicle. Issues may arise where the remote computing device or the vehicle are in an area of poor connectivity with the server and cannot sync, download, or determine the appropriate key to use. In this instance, a user may be locked out of the vehicle in an area in which the server is not available, can thus cannot receive an electronic key.

With these issues in mind, example embodiments of the present disclosure may provide systems, devices, and method that can enable a PaaK device to unlock a vehicle even when the device has a low or dead battery, and in locations in which communication with a server providing electronic keys is degraded or not possible.

Examples may include using near field communication (NFC) technology on the remote computing device to unlock the vehicle. The NFC technology of the phone may include an integrated circuit (IC) configured to store one or more electronic keys, and may be configured to operate even when the power source (battery) of the remote computing device is depleted. Electronic keys may be generated by the remote computing device, vehicle, server, or one or more other devices or systems, and may be stored by the remote computing device in the IC. The remote computing device may communicate with the server in order to synchronize with the vehicle, such that the remote computing device and the vehicle are synced to each other and the appropriate electronic key is used by the remote computing device. The vehicle may have corresponding NFC technology that enables the vehicle to communicate with the remote computing device.

When the remote computing device is sufficiently powered and can communicate with the server, unlocking the vehicle may be a relatively simple process. The remote computing device may initiate communication with the server, and the server may respond in order to synchronize the remote computing device with the vehicle. The remote computing device may then use the appropriate electronic key based on the synchronization, and the vehicle may be unlocked.

However this process may not work as easily, or at all, where there is poor communication between the remote computing device and the server, or where the remote computing device battery is dead. In these instances, an electronic key may be provided to the remote computing device before it loses communication with the server (either based on poor connectivity or a dead battery). That key may then be stored on the IC and used to unlock the vehicle even where there is no server communication.

Examples herein may include determining that the remote computing device is going to enter a compromised status in which communication with the server is not possible, and responsively providing the remote computing device with an electronic key that can be used to unlock the vehicle. This may include providing data used by the remote computing device to sync and store a key on an IC, which may be used for a limited time period. The server may provide a key (or sync the remote computing device) in anticipation that the remote computing device is going to lose communication and will not be able to request a new key at a later time. The electronic key provided will act as a stopgap that enables the user to unlock the vehicle for a limited time, even where the remote computing device battery is dead.

However, by storing the key on the IC, the remote computing device may be susceptible to third party sniffing techniques intended to steal the electronic key. As such, the key stored on the IC may be time limited, and may be invalid after a predetermined time. The vehicle may be set such that when the key is stored on the IC, a corresponding synchronization is performed with the vehicle and the server. And when the predetermined time elapses, the vehicle may be programmed to no longer unlock using the key. As such, the time limited nature of the key may be performed on the vehicle side as opposed to the remote computing device side.

FIG. 1 illustrates and example vehicle 100, a remote computing device 110, and a server 120. Vehicle 100 may be a standard gasoline powered vehicle, a hybrid vehicle, an electric vehicle, a fuel cell vehicle, or any other mobility implement type of vehicle. Vehicle 100 may be non-autonomous, semi-autonomous, or autonomous. Vehicle 100 may include parts related to mobility, such as a powertrain with an engine, a transmission, a suspension, a driveshaft, and/or wheels, etc. In the illustrated example, vehicle 100 may include one or more electronic components.

Vehicle 100 may include a first communication module 102 and a second communication module 104. First communication module 102 may be configured to communicate with a remote computing device such as remote computing device 110 using short range wireless communication technology, such as NFC communication. While examples may be described herein with respect to NFC communication in particular, it should be noted that other short range wireless technologies may be used as well.

Some examples may include communicating between communication module 102 and remote computing device 110 via use of a technology in which one side is powered and the other side is not, so that communication is possible when first communication module 102 is powered and the remote computing device 110 is not.

Second communication module 104 may be configured to communicate with the server 120, using one or more wireless communication protocols. Second communication module 104 may be configured to receive and transmit data, which may include receiving electronic keys and/or receiving data to synchronize electronic keys.

Figure 2:
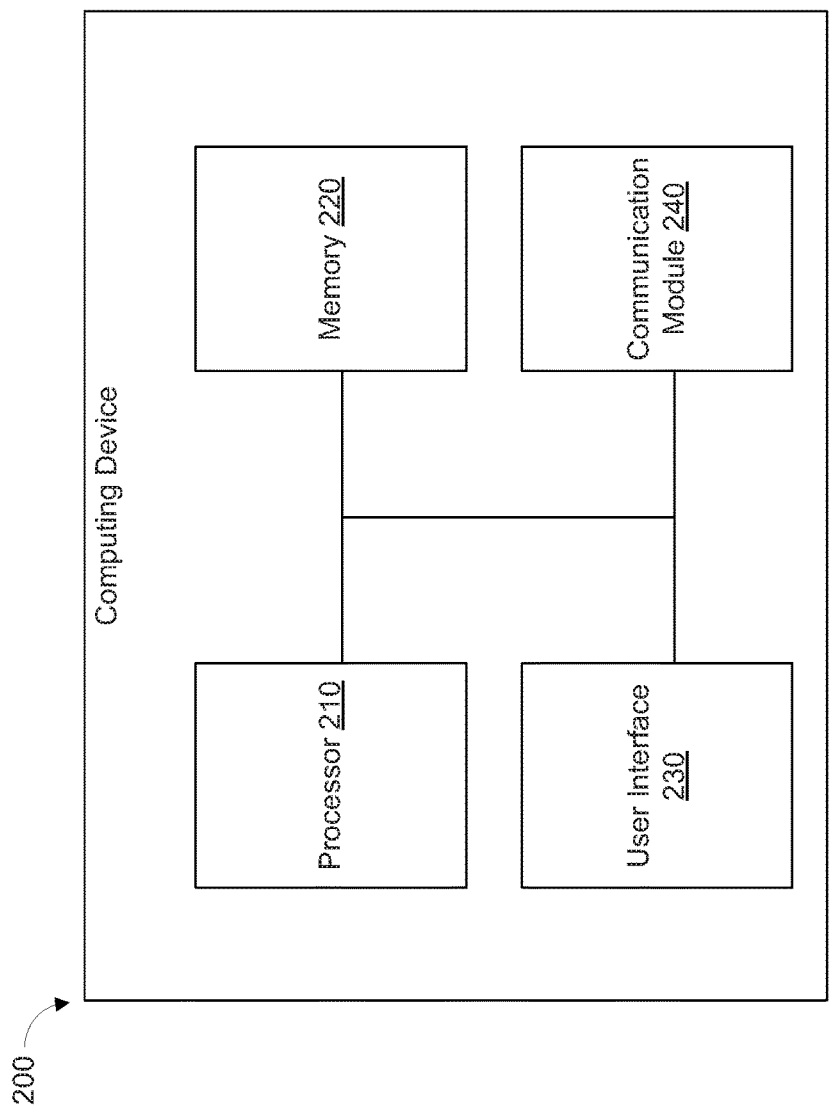
FIG. 2 illustrates a simplified block diagram of a computing device according to embodiments of the present disclosure.

First and second communication modules 102 and 104 may be part of or may include one or more computing devices, such as those described with respect to FIG. 2.

In some examples, vehicle 100 may store one or more electronic keys, which may require synchronization with the server 120 and/or remote computing device 110 in order to be used to unlock the vehicle. Upon startup of vehicle, vehicle 100 may receive an electronic key from the server (assuming connectivity is available). Then, if during normal operation of the vehicle communication with the server is lost, the received electronic key may be transmitted to the remote computing device 110 from vehicle 100. This may provide an electronic key to the remote computing device that may be used for a limited time, such as until the vehicle is cycled off and on again (i.e., one ignition cycle).

Remote computing device 110 may include circuitry configured to transmit and/or receive data from vehicle 100 and/or server 120, and may further include one or more features described with respect to FIG. 2.

Remote computing device 110 may include NFC technology 112, having an IC for storing one or more electronic keys. Remote computing device 100 may alternatively or in addition include other short range wireless communication technologies. Remote computing device 110 may also include a battery 114, and various circuitry configured to monitor the status of the battery.

In some examples, various methods, systems, and/or devices may be configured to determine that the remote computing device 110 and/or vehicle 100 is likely or predicted to enter a compromised status in which the remote computing device 110 and/or vehicle 100 cannot communicate with server 120.

In some examples, this may include determining that the remote computing device battery is going to be depleted in a threshold amount of time Or it may include determining that the battery has reached a threshold state of charge such as 30%. If the charge drops below the threshold level, one or more actions described herein may be taken, such as transmitting or syncing an electronic key, and storing the key on the remote computing device IC.

For instance, in response to determining that the battery has dropped below the threshold level, the remote computing device 110 may initiate communication with the server 120. The remote computing device 110 may request an updated electronic key, in some examples, receiving a key may comprise receiving data that can be used to generate the key or select the key from a list. As such, the remote computing device may receive the full electronic key from the server, or may receive data from the server that can be used to determine the electronic key either by generating a new key, selecting a key from a stored list, or otherwise determining a particular electronic key.

When the key is requested and then received by remote computing device 110, remote computing device 110 may responsively store the electronic key on a corresponding IC. This may enable remote computing device 110 to communicate with vehicle 100 using NFC technology even where the remote computing device battery 114 is depleted. The electronic key can then be used to unlock the vehicle.

When remote computing device 110 is determined to enter the compromised status based on a low battery, the electronic key requested by the remote computing device may be time limited, such that it can be used only for a predetermined time period (e.g., six hours, 24 hours, or a different time period). This time period may change based on a location of the vehicle, such that a vehicle known to be in a safe area (such as the vehicle owner's home or garage) may have a higher predetermined time than a vehicle in an unsafe or unfamiliar area. An unfortunate side effect of storing the electronic key on the IC may make it possible for third party sniffers or other electronic devices to read the electronic key and gain unauthorized access to the vehicle. So with this issue in mind, the electronic key stored on the IC may be time limited (i.e., can only unlock the vehicle during a predetermined duration of time) to prevent unauthorized parties from gaining access after the time has elapsed.

In order to time limit a given electronic key, the vehicle 100 may communicate with the server 120, and receive a message indicating that the key provided to the remote computing device 110 (due to the low battery) is time limited. After the predetermined time has elapsed, the vehicle may no longer recognize the electronic key as an acceptable key, and may not unlock based on that key.

In some examples, determining that the remote computing device 110 and/or vehicle 100 may enter a compromised status in which the remote computing device 110 and/or vehicle 100 cannot communicate with server 120 may include determining or predicting that the vehicle and/or remote computing device 110 will enter a geographical area in which communication with the server 120 is degraded, non-existent, or otherwise reduced. In these geographic areas, it may be difficult or impossible to communicate with the server in order to receive an updated electronic key or data that can be used to synchronize the electronic key.

In some examples, prior to entering a geographic area having reduced or non-existent communication with the server, an electronic key may be transmitted to the remote computing device and/or vehicle. The electronic key may then be used to unlock the vehicle even where no communication with the server is possible. The electronic key may also be time limited, or area limited, so as to prevent potential third parties from gaining unauthorized access to the vehicle.

In some examples, the geographic area having reduced or non-existent communication may be determined based on crowd sourced data from a plurality of vehicles. Further, the geographic area may be determined based on historical data from the remote computing device 110, in which communication and location data may be gathered over time and used to plot out geographic areas of good and poor connectivity. These and other scenarios are discussed in more detail below with respect to FIG. 3.

FIG. 2 illustrates an example block diagram of a computing device 200 according to embodiments of the present disclosure, one or more features of computing device 200 may be included in remote computing device 110, vehicle 100, server 120, and other devices or systems described herein.

Computing device 200 may include a processor 210 and a memory 220. Processor 210 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 220 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 220 includes multiple kinds of memory, particularly volatile memory and non-volatile memory.

The memory 220 may be computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory, the computer readable medium, and/or within the processor during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

Computing device 200 may include a user interface 230, configured to provide the ability for a user to interact with and control computing device 200. User interface 230 may include one or more input and/or output devices to receive input from and display information to a user. The input devices may include, for example, a control knob, an instrument panel, a digital camera for image capture and/or visual command recognition, a touch screen, an audio input device (e.g., microphone), buttons, or a touchpad. The output devices may include one or more displays, (e.g., a liquid crystal display (LCD), an organic light emitting diode (OLED) display, a flat panel display, a solid state display, etc.), and/or speakers.

Computing device 200 may further include one or more communication modules 240. Communication module 240 may allow wired or wireless communication with one or more other computing devices or systems using one or more communication protocols. The communications module may include wired or wireless network interfaces to enable communication with external networks. The communications module may also include hardware (e.g., processors, memory, storage, etc.) and software to control the wired or wireless network interfaces. The communications module may include, among others, an NFC module, a Bluetooth module, a GPS receiver, a dedicated short range communication (DSRC) module, a WLAN module, and/or a cellular modem, all electrically coupled to one or more respective antennas.

The communications module may also include a wired or wireless interface to enable direct communication with an electronic device (such as a smart phone, a tablet computer, a laptop, etc).

Figure 3:
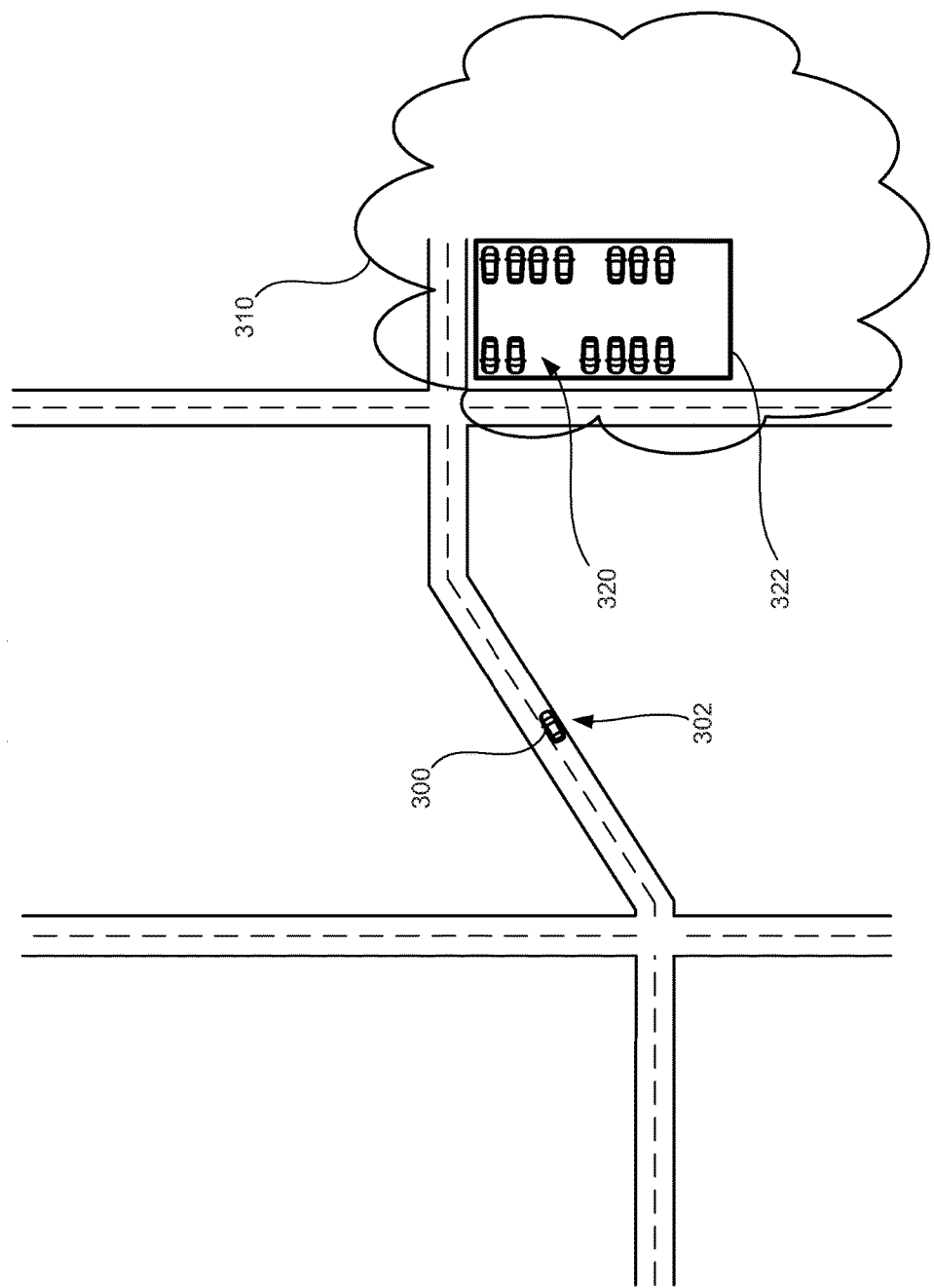
FIG. 3 illustrates an example map view showing aspects of various embodiments of the present disclosure.

FIG. 3 illustrates an example overhead map view showing aspects of various embodiments of the present disclosure. As noted above, a compromised status of the remote computing device may include that the computing device has entered or is predicted to enter a geographic area in which communication with the server is degraded or impossible. The geographic area may be referred to as a "low connectivity area," and the compromised status of the remote computing device may be referred to as a "low connectivity status"

Some examples may be described with respect to determining that the remote computing device is expected to or has entered a compromised status. However it should be understood that one or more embodiments of the present disclosure may include determining that the vehicle (such as vehicle 300) has entered or is predicted to enter a compromised status (rather than or in addition to the remote computing device).

Determining that the remote computing device will enter a compromised status of low connectivity may include determining a current location or predicting a future location of the remote computing device. The current location may be determined based on a GPS signal, via communication with one or more network cell towers, or in any other way.

A future or predicted location of the vehicle and/or remote computing device may be determined based on a route or entered destination (e.g., using a map or vehicle guidance application). In some examples, the location may be determined based on a route generate by the remote computing device and/or vehicle. The future location may be determined in part based on a current vehicle location, and a vehicle speed, acceleration, direction, heading, or other vehicle sensor data.

In some examples, a history of the vehicle location may be used. This can include determining the future location based on a pattern of parking locations of the vehicle based on work location, home location, store location, etc. Further, past destinations and parking locations, a learned schedule based on time of day, day of week, etc. may be used to determine or predict a future location of the vehicle.

Determining low connectivity geographic areas can include storing communication data over time, and building a map of low and high connectivity regions. Data may be transmitted to the server which may provide a map of connectivity based on connectivity of one or more vehicles, remote computing devices, or more. In some examples, determining a low connectivity area can include using topographical data (e.g., mountains, valleys, etc.) which may prevent communication. It may also include using data about one or more structures (e.g., a parking garage may provide low connectivity based on concrete or other interference). Other information may also be used to determine areas of low connectivity.

Some examples may include determining that the remote computing device will enter the low connectivity status based on the location of the vehicle and/or remote computing device itself. This can include using GPS or other information to determine the location of the remote computing device and/or vehicle, and comparing the determined location to a map of low connectivity regions, to determine whether the vehicle is predicted to enter a low connectivity area.

This may further include determining that the location of the vehicle is within a threshold distance of the geographic area of low connectivity. The vehicle speed and heading (as well as other data) may be considered in order to determine when communication with the remote computing device and/or vehicle is likely to end. For instance, this may include determining a distance from the current vehicle location to a parking garage or other parking location that is within an area of low connectivity. It may further include determining a distance to an edge of a low connectivity area.

In response to determining that the vehicle and/or remote computing device location is within a threshold distance, the remote computing device may request and the server may transmit an electronic key or data that can be used to sync an electronic key.

The threshold distance may be determined based on distance from communication source (e.g., one or more cell towers), a distance to a parking garage or other known geographic area of low connectivity, a distance to the edge of a known area of low connectivity, or more.

In some examples the threshold distance may change based on a speed of the vehicle and a time needed to transmit an electronic key or sync the electronic key. For instance, if it take ten seconds to transmit an electronic key, then a threshold distance may correspond to the current vehicle speed x ten seconds (plus a buffer distance), to allow sufficient time to transmit the electronic key before communication is lost. Once the vehicle reaches the threshold distance, an updated key may be sent to the remote computing device and/or vehicle.

In some examples, the vehicle, remote computing device, and/or server may determine a predicted parking location of the vehicle. This may include or be based on any of the data described above (e.g., historical parking locations, a time of day, an entered destination etc). If a determined parking location or destination is inside a geographic area determined to have low connectivity, then an electronic key or synchronization data may be responsively transmitted (while there is still communication between the server and the vehicle/remote computing device.) This can include waiting until the vehicle is close to the destination, or preempting a loss of signal by transmitting immediately once it is known that the vehicle will be parking in a low connectivity area.

Historical parking data may include any location where the vehicle has previously been powered off. This data can be used in connection with a time of day, day of the week, and one or more other patterns to determine or predict the likely stopping location of the vehicle at any given time.

FIG. 3 illustrates a vehicle 300 at a first location 302. One or more embodiments described herein may include determining that the likely parking location or future location of vehicle 300 is second location 320 of structure 322. This may be determined based on a schedule or history of vehicle 300, for example because structure 322 is a workplace of a driver of vehicle 300, and the vehicle is routinely parked at structure 322 on Monday through Friday during work hours.

Structure 322 may be determined to be in a geographic area 310 that includes poor connectivity. The poor connectivity may be due to one or more factors such as the nature of the structure 322 (e.g., metal walls, concrete, etc.) as well as the location of one or more network connection points (e.g., cell towers, etc). Geographic area 310 may be a low connectivity area in which the server may not be able to communicate with the vehicle 300 an/or a remote computing device that can be used to unlock the vehicle.

It may be determined that vehicle 300 is going to enter the low connectivity geographic area 310, and an electronic key may be responsively transmitted to the remote computing device. In addition, data (including an electronic key, or synchronization information) may be transmitted to the vehicle 300 to ensure that the vehicle and remote computing device are synced, and that the computing device is able to unlock the vehicle even when there is no connectivity to the server.

In some examples, an electronic key may be transmitted to both the vehicle and the remote computing device by the server. The electronic key may include two or more parts, which may be matched together to ensure that the remote computing device is authorized to unlock the vehicle. As such, the remote computing device may receive a first part of the key, and the vehicle may receive a second part of the key.

In some examples, the electronic key may be erased from the IC after a given period of time such as 6 hours, 24 hours, or more. In addition, the computing device, vehicle, and/or server may be configured to erase the electronic key upon starting up of the vehicle, and/or upon establishing communication with between the vehicle/remote computing device and the server. This may prevent an electronic key stored in the remote computing device IC from being sniffed or stolen by a third party.

In some examples, a backup electronic key may be generated and/or sent to the vehicle at start-up. This backup key may only be valid until the next key cycle (or for 24 hours). The backup key validity may be determined based on a different threshold than the other predetermined time described above. The backup key may be transmitted to the remote computing device by the vehicle (rather than server) when a loss of connectivity with the server occurs. The backup key may be stored in volatile memory of the remote computing device, and pushed to a programmable IC when the remote computing device battery is low. This can be particularly useful when connectivity is suddenly lost without an ability to transmit or sync with the server.

In some embodiments, the example vehicles disclosed herein may include one or more components configured to charge the remote computing device battery while the vehicle is locked, and while the remote computing device is located outside the vehicle. Example techniques for this feature are disclosed in U.S. patent application Ser. No. 15/615,600 entitled "Vehicle Unlocking Systems Devices And Methods," which is herein incorporated by reference.

Figure 4:
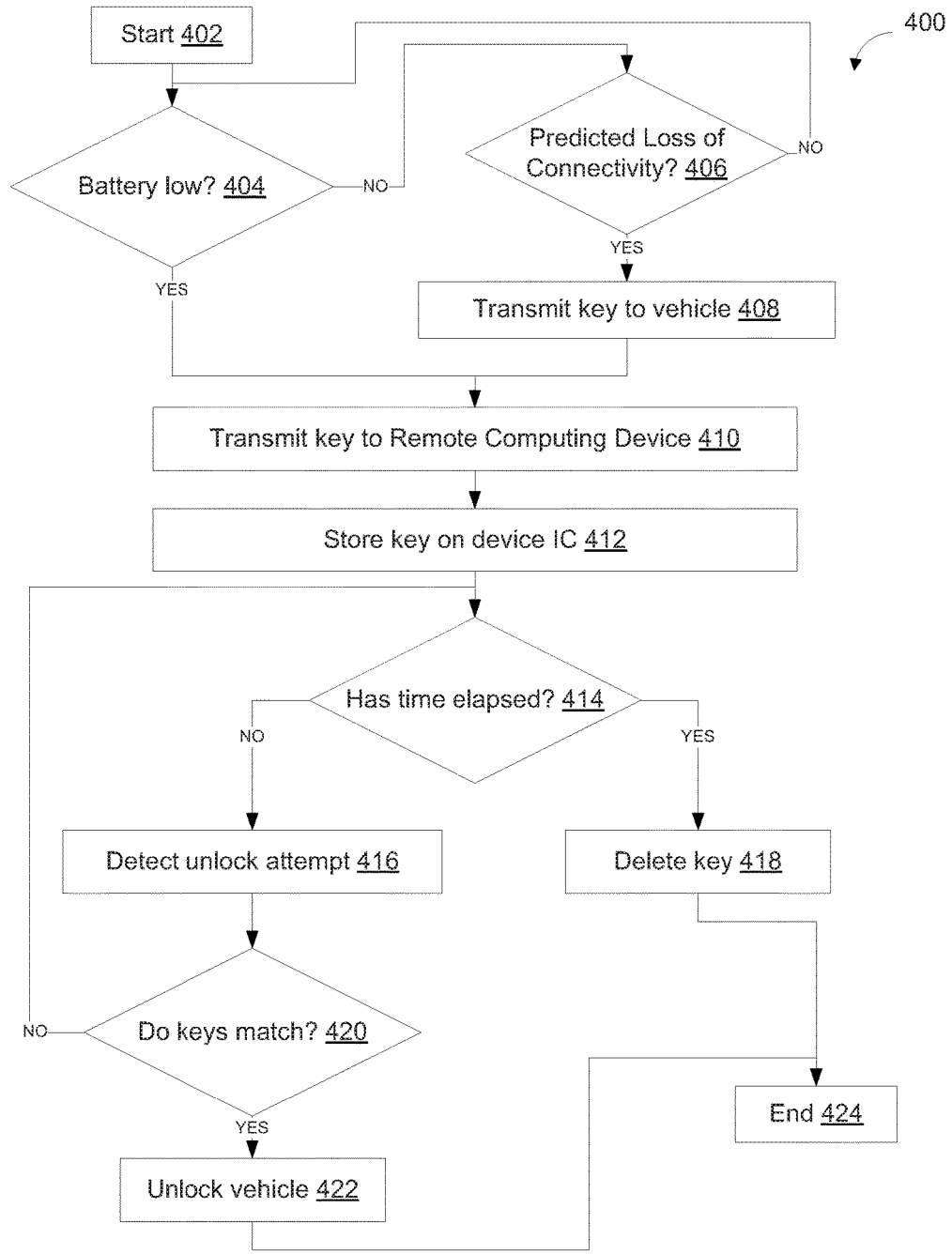
FIG. 4 illustrates a flowchart of an example method according to embodiments of the present disclosure.

FIG. 4 illustrates an example method 400 according to embodiments of the present disclosure. Method 400 may enable a remote unlocking device with a drained battery and/or entering an area of low connectivity to receive an electronic key to unlock a vehicle. The flowchart of FIG. 4 is representative of machine readable instructions that are stored in memory and may include one or more programs which, when executed by a processor may cause vehicle 100, remote computing device 110, server 120 and/or one or more systems or devices described herein to carry out one or more functions described herein. While the example program is described with reference to the flowchart illustrated in FIG. 4, many other methods for carrying out the functions described herein may alternatively be used. For example, the order of execution of the blocks may be rearranged or performed in series or parallel with each other, blocks may be changed, eliminated, and/or combined to perform method 400. Further, because method 400 is disclosed in connection with the components of FIGS. 1-3, some functions of those components will not be described in detail below.

Method 300 may start at block 302. At block 304, method 300 may include determining whether a batter of the remote computing device is low. This may include comparing a current state of charge to a threshold state of charge, to determine whether the current charge is low enough.

If the battery of the remote computing device is low, method 400 may include transmitting an electronic key to the remote computing device before the battery is depleted at block 410.

Block 406 of method 400 may include determining whether the remote computing device is likely to lose connectivity with the server. If the battery is not low at block 404, and there is no predicted upcoming loss of connectivity, method 400 may revert back to block 404.

But if there is a predicted loss of connectivity at block 406, method 400 may include transmitting an electronic key to the vehicle at block 408. This may alternatively include transmitting data that can be used to synchronize a key, or generate a key.

At block 410, method 400 may include transmitting a key to the remote computing device. And at block 412, method 400 may include storing the electronic key on an IC of the remote computing device. In some examples, the key may be stored on the IC responsive to the remote computing device receiving the key (i.e., immediately or soon after receiving the key). Alternatively, the key may be saved in a volatile memory of the remote computing device, and stored on the IC after it is determined that the battery is low and the remote computing device is about to power off.

At block 414, method 400 may include determining whether a time has elapsed since the electronic key was transmitted to the remote computing device. As noted above, the electronic key may be time limited to prevent unauthorized access after the time has expired. IF the time has elapsed, block 418 may include deleting the electronic key. The key may be deleted from the remote computing device, or alternatively the vehicle may be programmed to no longer recognize or accept the electronic key after the time has elapsed.

However if the time has not elapsed, method 400 may include detecting an attempt to unlock the vehicle at block 416. The attempt may be detected by the vehicle. At block 420, method 400 may include determining whether the electronic key from the remote computing device matches a key of the vehicle. If the keys match, the vehicle may unlock at block 422. However, if the keys do not match, method 400 may return to block 414. Method 400 may end at block 424.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle unlock system comprising:
   a server configured to:
      store an electronic key; and
      transmit the electronic key in response to a request signal; and
   a remote computing device configured to:
      transmit the request signal in response to determining that the remote computing device will enter a compromised status in which the remote computing device cannot communicate with the server;
      receive the electronic key; and
      unlock a vehicle using the electronic key.

2. The vehicle unlock system of claim 1, wherein the compromised status comprises a low battery, and wherein the electronic key is configured to unlock the vehicle for a predetermined period of time, such that after the predetermined period of time has elapsed the electronic key can no longer unlock the vehicle.

3. The vehicle unlock system of claim 1, wherein the compromised status comprises a low connectivity status, the server is further configured to determining a geographic area in which communication between the server and the remote computing device is degraded, and wherein the remote computing device is further configured to:
   determine that a location of the vehicle is within a threshold distance from the geographic area; and
   responsively request the electronic key.

4. The vehicle unlock system of claim 1, wherein the server is further configured to determine a geographic area in which communication between the server and the remote computing device is degraded, and wherein the remote computing device is further configured to:
   determine a predicted parking location of the vehicle; and
   determining that the predicted parking location of the vehicle is inside the geographic area.

5. A method of operating a remote computing device for unlocking a vehicle, comprising:
   responsive to determining that the remote computing device will enter a compromised status in which the remote computing device cannot communicate with a server, requesting an electronic key from the server;
   receiving the electronic key from the server; and
   unlocking the vehicle using the electronic key.

6. The method of claim 5, wherein the compromised status comprises a low battery.

7. The method of claim 5, wherein the electronic key is configured to unlock the vehicle for a predetermined period of time, such that after the predetermined period of time has elapsed the electronic key can no longer unlock the vehicle.

8. The method of claim 5, wherein the compromised status comprises a low connectivity status, the method further comprising:
   determining that the remote computing device will enter the low connectivity status based on a location of the vehicle.

9. The method of claim 8, further comprising:
   determining a geographic area in which communication with the server is degraded.

10. The method of claim 9, wherein the geographic area is determined based on location data and communication data from a plurality of remote computing devices.

11. The method of claim 9, further comprising;
    determining that the location of the vehicle is within a threshold distance from the geographic area; and
    responsively requesting the electronic key.

12. The method of claim 9, further comprising;
    determining a predicted parking location of the vehicle; and
    determining that the predicted parking location of the vehicle is inside the geographic area.

13. The method of claim 12, wherein the predicted parking location is determined based on historical parking data corresponding to the vehicle.

14. A non-transitory, computer readable medium of a remote computing device having instructions stored thereon that, when executed by a processor of the remote computing device, cause performance of a set of acts comprising:
    responsive to determining that the remote computing device will enter a compromised status in which the remote computing device cannot communicate with a server, requesting an electronic key from the server;
    receiving the electronic key from the server; and
    unlocking a vehicle using the electronic key.

15. The non-transitory, computer readable medium of claim 14, wherein the compromised status comprises a low battery, and wherein the electronic key is configured to unlock the vehicle for a predetermined period of time, such that after the predetermined period of time has elapsed the electronic key can no longer unlock the vehicle.

16. The non-transitory, computer readable medium of claim 14, wherein the compromised status comprises a low connectivity status, the set of acts further comprising:
    determining that the remote computing device will enter the low connectivity status based on a location of the vehicle.

17. The non-transitory, computer readable medium of claim 16, the set of acts further comprising:
    determining a geographic area in which communication with the server is degraded, wherein the geographic area is determined based on location data and communication data from a plurality of remote computing devices.

18. The non-transitory, computer readable medium of claim 16, the set of acts further comprising:
    determining a geographic area in which communication with the server is degraded;
    determining that the location of the vehicle is within a threshold distance from the geographic area; and
    responsively requesting the electronic key.

19. The non-transitory, computer readable medium of claim 16, the set of acts further comprising:
   determining a geographic area in which communication with the server is degraded;
   determining a predicted parking location of the vehicle; and
   determining that the predicted parking location of the vehicle is inside the geographic area.

20. The non-transitory, computer readable medium of claim 19, wherein the predicted parking location is determined based on historical parking data corresponding to the vehicle.

\* \* \* \* \*